United States Patent
Kuroki

(10) Patent No.: US 9,016,747 B2
(45) Date of Patent: Apr. 28, 2015

(54) ATTACHMENT STRUCTURE OF DOOR MIRROR

(71) Applicant: Mazda Motor Corporation, Aki-gun, Hiroshima (JP)

(72) Inventor: Daishi Kuroki, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 14/078,995

(22) Filed: Nov. 13, 2013

(65) Prior Publication Data
US 2014/0132029 A1    May 15, 2014

(30) Foreign Application Priority Data
Nov. 14, 2012 (JP) ................. 2012-250121

(51) Int. Cl.
*B60J 5/04* (2006.01)
*B60R 1/06* (2006.01)

(52) U.S. Cl.
CPC ............. *B60J 5/0404* (2013.01); *B60R 1/06* (2013.01); *B60J 5/0436* (2013.01); *B60J 5/0429* (2013.01); *B60J 5/0441* (2013.01); *B60J 5/0451* (2013.01)

(58) Field of Classification Search
CPC ........ B60J 5/0404; B60J 5/042; B60J 5/0422; B60J 5/0436; B60J 5/0441; B60R 1/006; B60R 1/06

USPC ........ 296/1.11, 30, 146.5, 146.6, 152, 187.12
See application file for complete search history.

(56) References Cited

U.S. PATENT DOCUMENTS

| | | | |
|---|---|---|---|
| 5,857,731 A * | 1/1999 | Heim et al. | 296/146.2 |
| 6,302,473 B1 * | 10/2001 | Weber | 296/146.6 |
| 8,132,845 B2 * | 3/2012 | Kinoshita et al. | 296/146.6 |
| 2002/0073627 A1 * | 6/2002 | Hock | 49/502 |
| 2007/0145770 A1 * | 6/2007 | Katou et al. | 296/146.6 |
| 2009/0134304 A1 * | 5/2009 | Rieder et al. | 248/475.1 |
| 2010/0019533 A1 * | 1/2010 | Kinoshita et al. | 296/146.6 |

FOREIGN PATENT DOCUMENTS

| | | | |
|---|---|---|---|
| DE | 102008038845 A1 * | 2/2010 | |
| DE | 102008047463 A1 * | 4/2010 | |
| JP | 2001-097120 A | 4/2001 | |

* cited by examiner

*Primary Examiner* — Glenn Dayoan
*Assistant Examiner* — Jason S Daniels
(74) *Attorney, Agent, or Firm* — Studebaker & Brackett PC

(57) ABSTRACT

At least two reinforcing members are provided apart from each other in a vertical direction, a connecting member formed integrally with or separately from a door mirror reinforcement is provided, and the connecting member interconnects the two reinforcing members vertically at a position which is located in back of front ends of the two reinforcing members. Accordingly, the better visibility can be provided, the attachment rigidity can be increased, and the door strength can be properly improved.

8 Claims, 6 Drawing Sheets

ATTACHMENT STRUCTURE OF DOOR MIRROR

BACKGROUND OF THE INVENTION

The present invention relates to an attachment structure of a door mirror which is attached to a door provided on a driver's-seat side of a vehicle, and specifically relates to an attachment structure of a door mirror which can ensure the attachment rigidity of the door mirror and have a sufficient strength against a vehicle side collision.

Conventionally, it is known that a door mirror is provided at a so-called triangular corner portion which is formed by a beltline portion and a front pillar (a so-called A pillar) of a front side door at a front-end portion of a side window. Also, a structure in which a door mirror is provided, not at the triangular corner portion, at a position which is located in back of the triangular corner portion, projecting outward from a door outer panel is known.

The structure according to the former may provide less visibility for a driver seated in a driver's seat, but the structure according to the latter can provide better visibility. That is, in the former structure, some visible area may be improperly shut off by the triangular corner portion, which is a mirror attachment portion, and a front pillar portion. According to the latter structure, however, a sporty vehicle design can be attained, and also since a space in front of the mirror is utilized to improve the driver's visibility for an outside area right behind the front pillar, the better visibility can be obtained.

In a case in which the door mirror is provided to project outward from the door outer panel as described above, however, there is a concern that simply fixing the door mirror to the door outer panel may cause a lack of the attachment strength of the door mirror, so that noise may be improperly caused by vehicle's vibrations which occur during the vehicle traveling. As one of countermeasures against this concern, a certain structure, as shown in Japanese Patent Laid-Open Publication No. 2001-97120, in which a bracket fixed to a structural member of a front side door, such as a glass run channel (see a division bar), extends up to a door-mirror attachment position, and a door mirror is fixed to both a door outer panel and the above-described bracket is known.

Meanwhile, some means may be necessary in order to restrain the front side door from deforming toward the inside of a vehicle compartment against a vehicle collision, particularly against a vehicle side collision in which it is difficult to ensure a sufficient stroke for impact absorption. In general, a reinforcing member extending in a vehicle longitudinal direction is provided inside the front side door so as to restrain a vehicle-body deformation in the collision. However, since providing such a reinforcing member may cause increase of parts number or attaching steps, thereby increase the vehicle weight, there is a room for improvement.

SUMMARY OF THE INVENTION

The present invention has been devised in view of the above-described matters, and an object of the present invention is to provide an attachment structure of a door mirror which can provide the better visibility, increase the attachment rigidity, and also properly improve the door strength.

According to the present invention, there is provided an attachment structure of a door mirror which comprises a door provided on a driver's-seat side of a vehicle and comprising an inner panel and an outer panel, at least two reinforcing members provided, apart from each other in a vertical direction, between the inner panel and the outer panel of the door, extending in a vehicle longitudinal direction from a front end of the door to a rear end of the door, and fixed to the front and rear ends of the door at both ends thereof, a door mirror reinforcement, to which the door mirror positioned in back of a front end of a side window of the door is fixed via the outer panel of the door, and a connecting member formed integrally with or separately from the door mirror reinforcement, the connecting member interconnecting the two reinforcing members vertically at a position which is located in back of front ends of the two reinforcing members. Herein, the above-described at least two reinforcing members may be an impact bar and/or a load pass pipe.

According to the present invention, since the door mirror is positioned in back of the front end of the side window of the door for a relatively-rear layout of the door mirror, the better visibility can be provided for a driver. Further, since the door mirror is indirectly connected to the reinforcing members provided inside the door on the driver's-seat side via the connecting member, the attachment rigidity of the door mirror can be increased. Moreover, since the two reinforcing members are interconnected vertically by the connecting member at the position located in back of the front ends of the two reinforcing members, the door strength against the vehicle side collision can be improved, thereby improving the safety in the vehicle side collision.

According to an embodiment of the present invention, the connecting member is fixed to an inward side, in a vehicle width direction, of one of the two reinforcing members and to an outward side, in the vehicle width direction, of the other of the two reinforcing members. Herein, the above-described one reinforcing member may be an impact bar, and the above-described other reinforcing member may be a load pass pipe. According to the present embodiment, a load which may be inputted to the above-described one reinforcing member inward in the vehicle width direction in the vehicle side collision can be surely transmitted to the above-described other reinforcing member via the connecting member, so that the side-collision load can be properly dispersed.

According to another embodiment of the present invention, the two reinforcing members are configured such that a distance, in the vertical direction, of the two reinforcing members increases toward a vehicle rear. Thereby, since the reinforcing members are interconnected by the connecting member at a position where the two reinforcing members are apart from each other, the strength against the side collision can be increased and also the load transmission efficiency can be improved.

According to another embodiment of the present invention, the other of the two reinforcing members extends substantially horizontally from a position of a door hinge, and the one of the two reinforcing members is arranged below the other of the two reinforcing members. Herein, the above-described other reinforcing member may be a load pass pipe for the vehicle frontal collision, and the above-described one reinforcing member may be an impact bar for the vehicle side collision. According to the present embodiment, the above-described other reinforcing member is a member having a high strength in the vehicle longitudinal direction, the above-described one reinforcing member is a member having a high strength in the vehicle width direction, and the reinforcing members are interconnected by the connecting member at a position where the two reinforcing members are apart from each other. Accordingly, improvement of the attachment rigidity of the door mirror in the plural directions (the vehicle longitudinal direction and the vehicle width direction) can be attained and also the superior anti-vibration effect can be ensured.

Other features, aspects, and advantages of the present invention will become apparent from the following description which refers to the accompanying drawings.

DETAILED DESCRIPTION OF THE INVENTION

Figure 1:
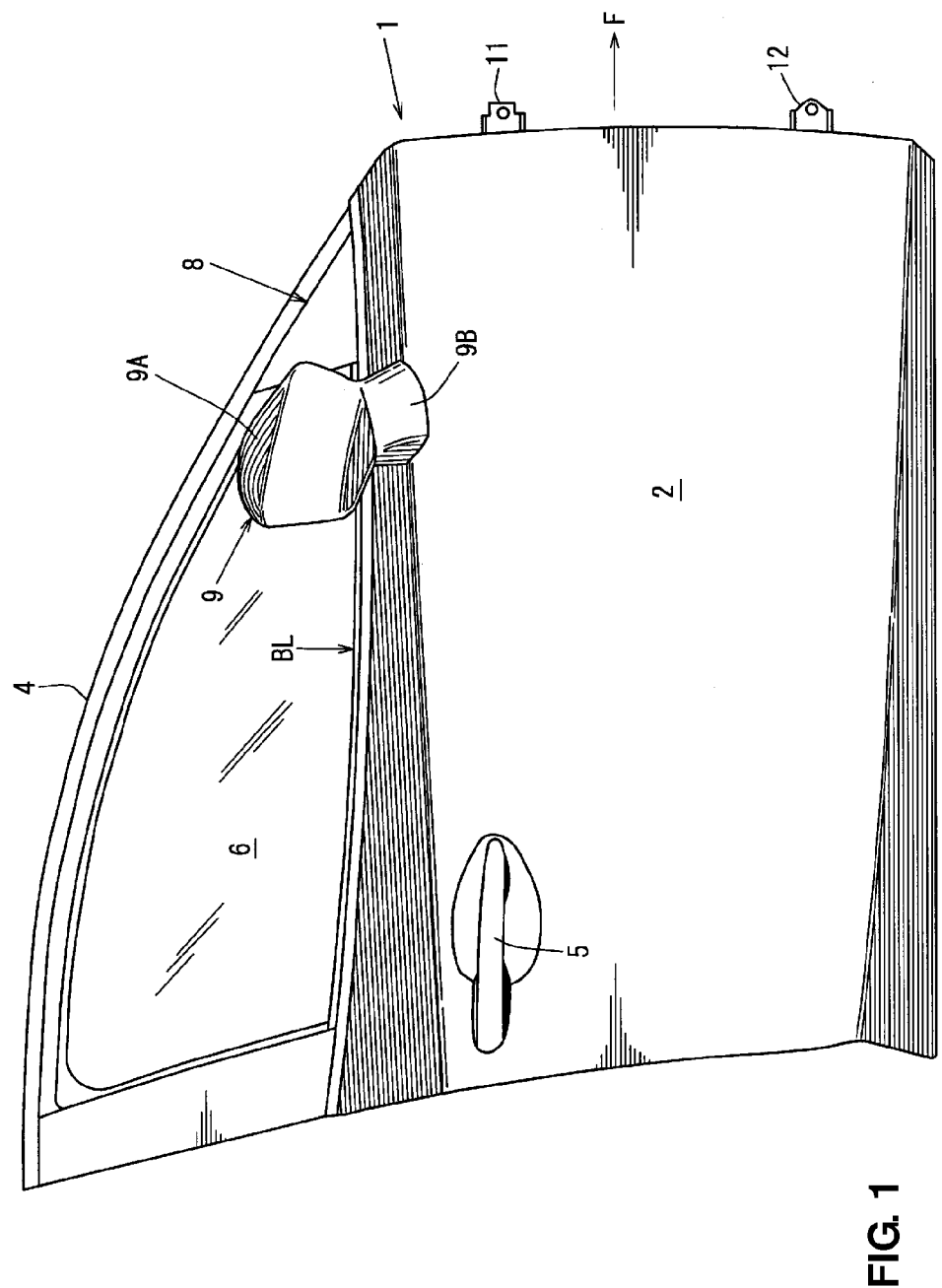
FIG. 1 is a side view of a door provided on a driver's-seat side of a vehicle equipped with an attachment structure of a door mirror of the present invention.
Figure 2:
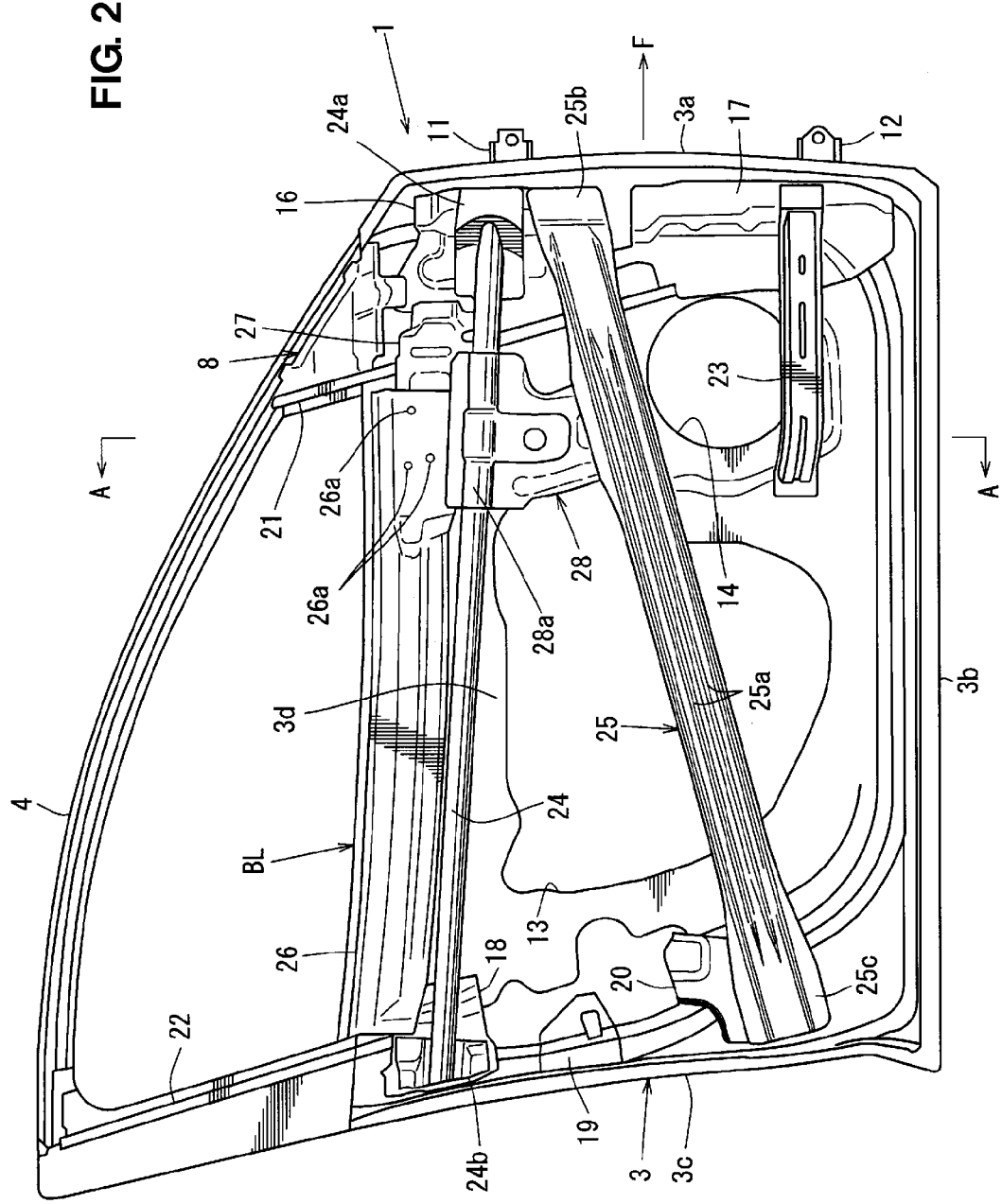
FIG. 2 is a side view showing the door provided on the driver's-seat side of the vehicle in a state in which a door outer panel and a door mirror are removed.
Figure 3:
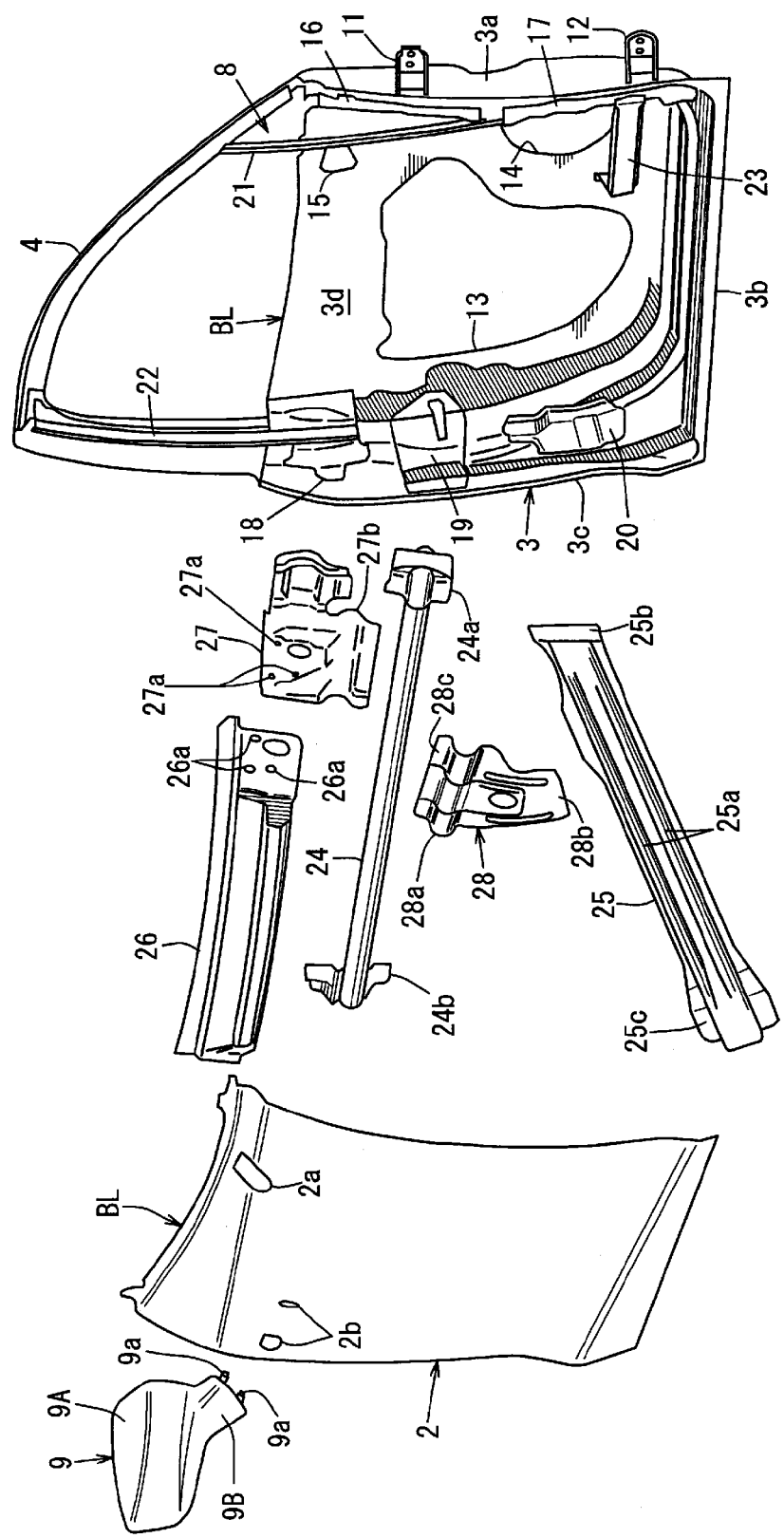
FIG. 3 is an exploded perspective view of the door provided on the driver's-seat side of the vehicle.
Figure 4:
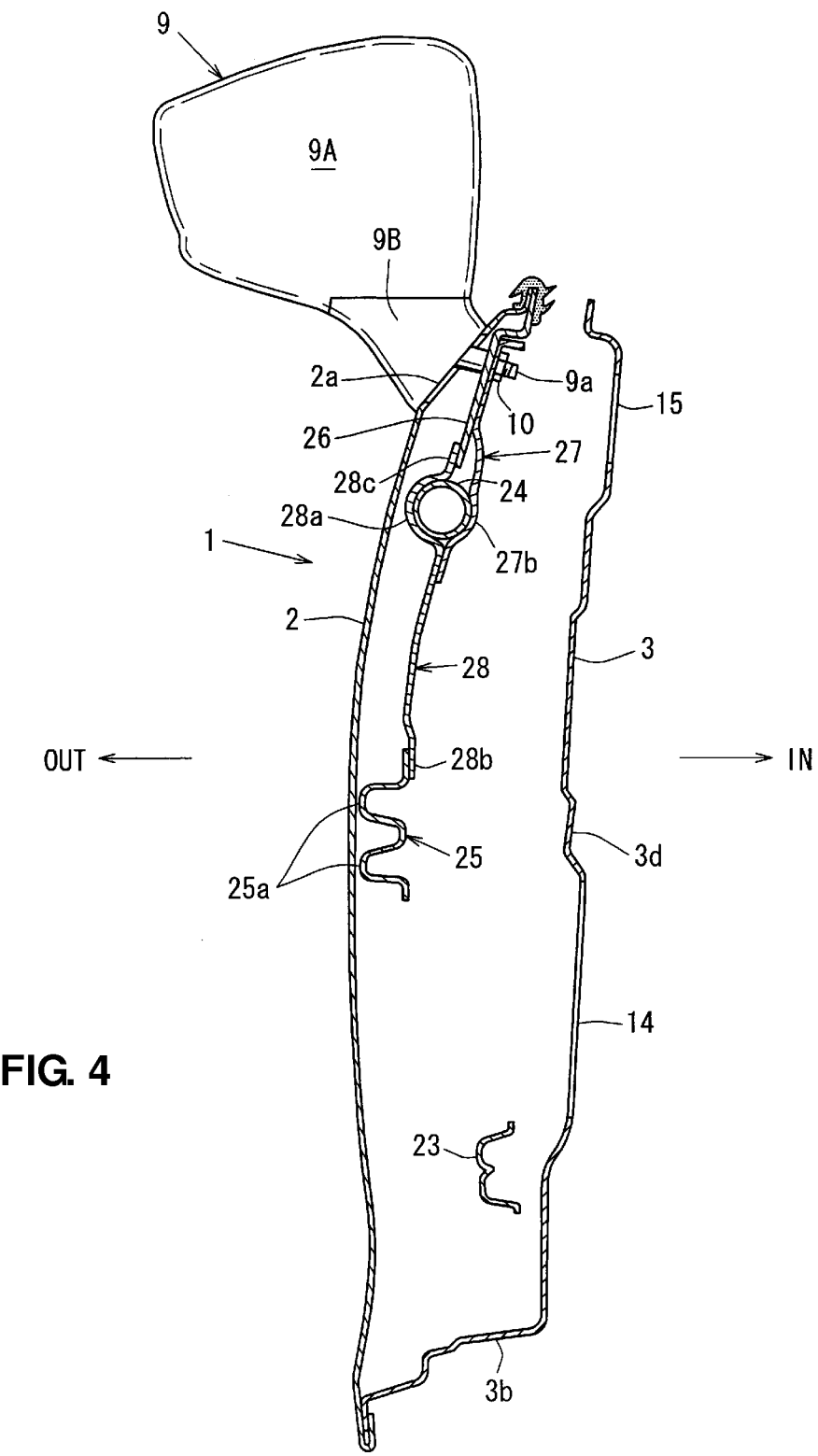
FIG. 4 is a sectional view of a major portion taken along line A-A of FIG. 2.
Figure 5:
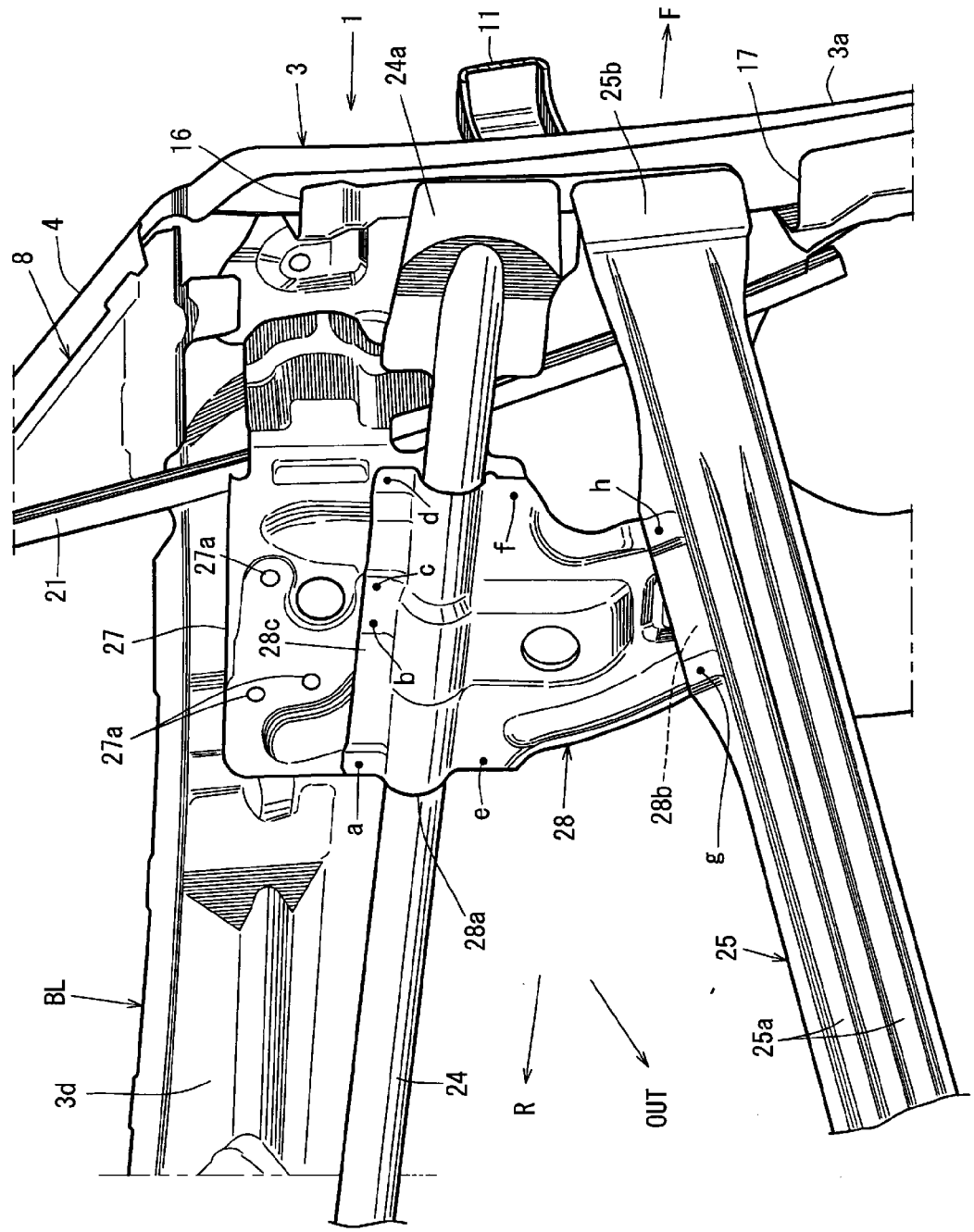
FIG. 5 is an enlarged perspective view of the major portion in a state in which a beltline reinforcement is removed from a state shown in FIG. 2.

Hereinafter, a preferred embodiment of the present invention will be described specifically referring to the accompanying drawings. Figures show an attachment structure of a door mirror. FIG. 1 is a side view of a door provided on a driver's-seat side of a vehicle equipped with this attachment structure, FIG. 2 is a side view showing the door provided on the driver's-seat side of the vehicle in a state in which a door outer panel and a door mirror are removed, FIG. 3 is an exploded perspective view of the door provided on the driver's-seat side of the vehicle, FIG. 4 is a sectional view of a major portion taken along line A-A of FIG. 2, and FIG. 5 is an enlarged perspective view of the major portion in a state in which a beltline reinforcement is removed from a state shown in FIG. 2. In these figures, an arrow F shows a vehicle forward direction, an arrow R shows a vehicle rearward direction, an arrow IN shows an inward direction in a vehicle width direction, and an arrow OUT shows an outward direction in the vehicle width direction.

In FIGS. 1-4, a front side door 1, which is provided on a driver's-seat side of the vehicle so as to open or close a door opening, comprises an outer panel 2 and an inner panel 3, and also has, as shown in FIG. 1, a door sash portion 4 at an upper portion of its door body which is formed by the outer and inner panels 2, 3 which are joined together, and a door outer handle 5 at a specified portion of its outer panel 2. Further, as shown in FIG. 1, a triangular corner portion 8 which is formed by a beltline portion BL and a front pillar 7 (see FIG. 6) is provided at a front-end portion of a side window 6 (a so-called door glass).

Figure 6:
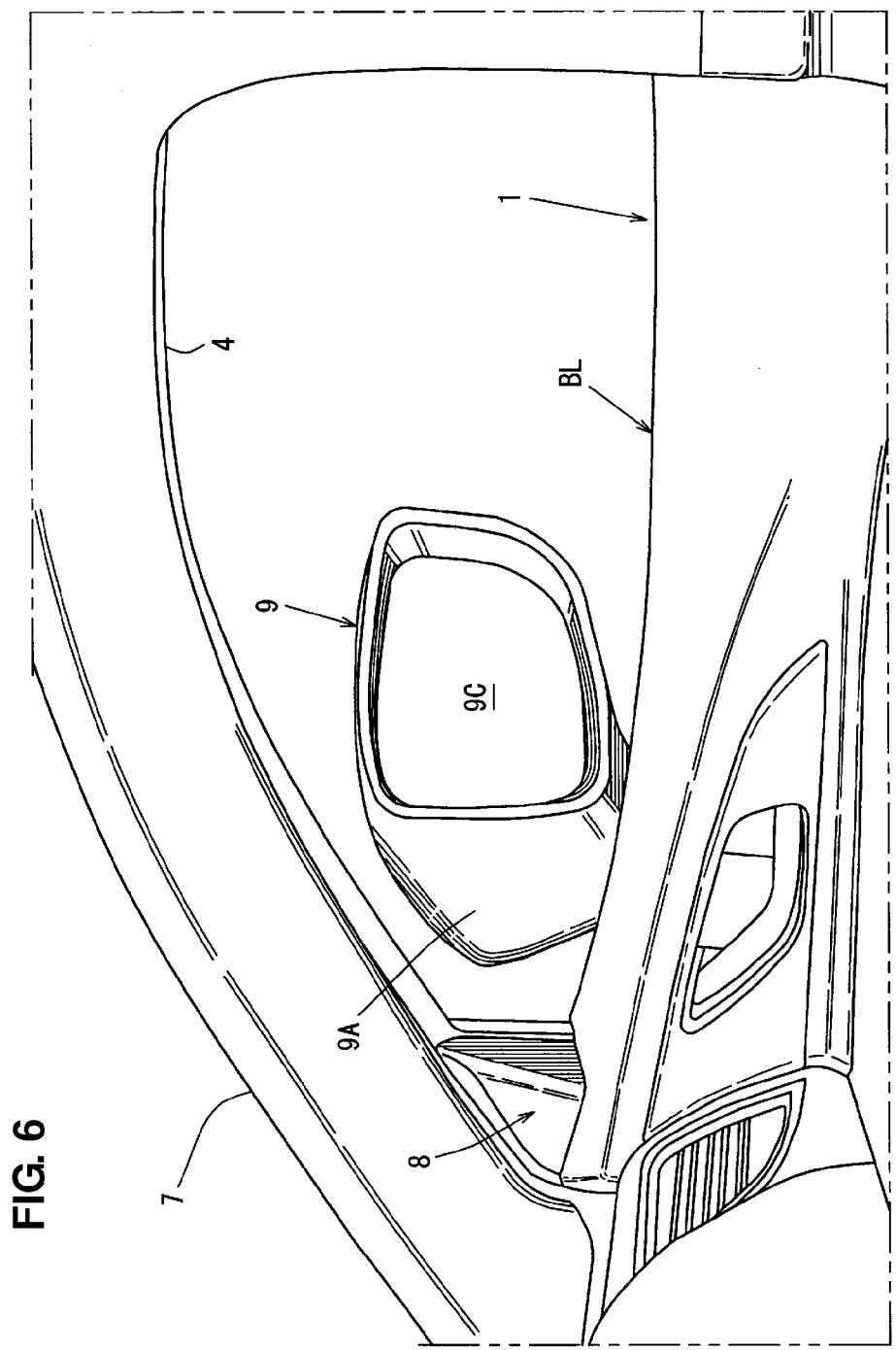
FIG. 6 is a perspective view explaining a visible area of the door mirror.

In the present embodiment, a door mirror 9 projecting outward from the outer panel 2 is provided at a position located in back of the triangular corner portion 8, that is—positioned in back of a front end of the side widow 6, so that a space in front of the door mirror 9 can be used as a visible portion to allow a driver seated in a driver's seat to see an outside area right behind the front pillar 7 through this space as shown in FIG. 6. The door mirror 9 comprises a door mirror body 9A equipped with a mirror 9C (see FIG. 6) and a door mirror base 9B attaching the mirror body 9A to the outer panel 2.

As shown in FIG. 3, an attachment hole 2a is formed at an attachment portion of the door mirror 9 of the outer panel 2, and an attachment hole 2b for attaching the door outer handle 5 is formed at a position which is located below and in back of the attachment hole 2a. As shown in the same figure, at a base end portion of the door mirror base 9B of the door mirror 9 are fixed plural bolts, three bolts for example, 9 which extend inward, in the vehicle width direction, from this base end portion (part of these bolts only are illustrated in this figure). The bolts 9a are inserted into the inside of the outer panel 2 through the attachment hole 2a, respectively, and then plural nuts 10 shown in FIG. 4 are fastened, so that the door mirror base 9B, the outer panel 2, a beltline reinforcement 26, and a door mirror reinforcement 27 (described below) are fixed together. Further, the door outer handle 5 shown in FIG. 1 is attached by using the above-described attachment hole 2b of the outer panel 2.

The inner panel 3 is formed, through pressing, integrally by a front side portion 3a, a lower side portion 3b, a rear side portion 3c, and a vertical wall portion 3d which is enclosed by the side portions 3a, 3b, 3c as shown in FIG. 3. Door hinge brackets 11, 12 are attached to an upper position and a lower position of a front face of the front side portion 3a. Further, at the above-described vertical wall portion 3d are formed an opening portion 13 for arranging a door module, an opening portion 14 for arranging a speaker which is positioned in front of the opening portion 13, and an opening portion 15 which faces the above-described bolts 9a and nuts 10.

As shown in FIGS. 3 and 5, an upper hinge reinforcement 16 is attached between the front side portion 3a and the vertical wall portion 3d of the inner panel 3, corresponding to the above-described upper door hinge bracket 11. Likewise, a lower hinge reinforcement 17 is attached between the front side portion 3a and the vertical wall portion 3d of the inner panel 3, corresponding to the above-described lower door hinge bracket 12.

Further, as shown in FIG. 3, a rear reinforcement upper 18 is jointly fixed to an upper portion of the rear side portion 3c of the inner panel 3, a latch reinforcement 19 is jointly fixed to a middle portion, in a vertical direction, of the rear side portion 3c, and a rear reinforcement lower 20 is jointly fixed to a lower portion of the rear side portion 3c.

Moreover, as shown in FIGS. 2 and 3, a pair of front-and-rear glass guides 21, 22 which vertically guide front and rear end portions of the side window 6 are attached to the inner panel 3. Thus, the side window 6 is configured to go up and down along the pair of front-and-rear glass guides 21, 22.

As shown in FIGS. 2 and 3, an outer reinforcement 23 having a relatively short longitudinal-length is attached substantially horizontally between the front side portion 3a and a portion of the vertical wall portion 3d which is located between the opening portions 13, 14, corresponding to the above-described lower door hinge bracket 12, so that the tensional rigidity of the outer panel 2 can be improved by this outer reinforcement 23.

Further, as shown in FIGS. 2 and 3, a load pass pipe 24 and an impact bar 25, which correspond to two reinforcing members provided, apart from each other in the vertical direction, between the inner panel 3 and the outer panel 2, extending in the vehicle longitudinal direction from a front end of the door to a rear end of the door, and fixed to the front and rear ends of the door at both ends thereof, are provided between the inner panel 3 and the outer panel 2. Herein, the impact bar 25, as one of the two reinforcing members, is a member for the vehicle side collision which has the high strength in the vehicle width direction, and the load pass pipe 24, as the other of the two reinforcing members, is a member for the vehicle frontal collision which has the high strength in the vehicle longitudinal direction.

As shown in FIG. 2, the load pass pipe 24 is a member which extends substantially horizontally from a position corresponding to the upper door hinge bracket 11 and transmits the load inputted from the front side frame in the vehicle frontal collision rearward to the center pillar from the hinge pillar. Also, the impact bar 25 is provided below the load pass pipe 24, and the load pass pipe 24 and the impact bar 25 are attached such that a distance, in the vertical direction, of these members 24, 25 increases toward the vehicle rear.

Specifically, the load pass pipe 24 and the impact bar 25 are attached such that the distance between relatively-rear portions of these members becomes gradually greater. Also, the above-described impact bar 25 is attached such that a front end of an upper portion of the impact bar 25 is fixed to a specified position near the upper door hinge bracket 11 and a rear end of a lower portion of the impact bar 25 is fixed to another specified position near a root portion of the center pillar. Thus, the load pass pipe 24 and the impact bar 25 are arranged in a cross layout shape.

The above-described load pass pipe 24 is made of a metal-made circular pipe having a closed cross section, for example, and joint flange portions 24a, 24b are integrally provided at front and rear ends of the load pass pipe 24, respectively. As shown in FIG. 2, the front joint flange portion 24a is fixed to the upper hinge reinforcement 16 which corresponds to the upper door hinge bracket 11 by joint means, such as spot welding. The rear joint flange portion 24b is fixed to the rear reinforcement upper 18 by joint means, such as spot welding. Thus, the load pass pipe 24 is attached such that it extends longitudinally and substantially horizontally from the door front end to the door rear end.

The above-described impact bar 25 is, as shown in FIGS. 2, 3 and 4, a rigidity member which includes plural linear portions, such as two linear beads 25a, 25a, extending along a longitudinal direction of the impact bar 25 and joint flange portions 25b, 25c integrally formed at front and rear ends thereof, respectively. As shown in FIG. 2, the front joint flange portion 25b of the impact bar 25 is fixed to the upper hinge reinforcement 16 just below the front joint flange portion 24a of the load pass pipe 24 by joint means, such as spot welding. The rear joint flange portion 25c is fixed to the rear reinforcement lower 20 by joint means, such as spot welding. Thus, the impact bar 25 is attached such that it extends longitudinally from the door front end to the door rear end, slanting downward and rearward.

Meanwhile, as shown in FIGS. 2, 3 and 4, the beltline reinforcement 26 to reinforce the inside, in the vehicle width direction, of the outer panel 2 is provided along the beltline portion BL. This beltline reinforcement 26 is a rigidity member extending longitudinally along the beltline portion BL.

As shown in FIGS. 2-5, the door mirror reinforcement 27 is provided at a specified position corresponding to an attachment position of the door mirror 9. A front portion of the door mirror reinforcement 27 is fixed to a rear portion of the upper hinge reinforcement 16 at a specified position which is located just below the triangular corner portion 8 by joint means, such as spot welding. Further, other portions of the door mirror reinforcement 27 are jointly fixed to the beltline reinforcement 26.

As shown in FIG. 4, the above-described door mirror reinforcement 27 is arranged on the inward side, in the vehicle width direction, of the beltline reinforcement 26 and the load pass pipe 24. The beltline reinforcement 26 and the door mirror reinforcement 27 have bolt through holes 26a . . . , 27a . . . for the three bolts 9a . . . of the door mirror base 9B of the door mirror 9, respectively. After the three bolts 9a . . . of the door mirror base 9B are inserted into the bolt through holes 26a, 27a, the nuts 10 are fastened to the bolts 9a projecting inward from the door mirror reinforcement 27 as shown in FIG. 4. Thereby, the door mirror 9 is fixed to the both reinforcements 26, 27 via the outer panel 2. Further, the door mirror reinforcement 27 has a recess portion 27b which is concaved in an arc shape along an inward face, in the vehicle width direction, of the load pass pipe 24.

Moreover, as shown in FIGS. 2-5, a junction 28 is provided as a connecting member which is formed integrally with or separately from the door mirror reinforcement 27 (t is formed separately from that in the present embodiment). This junction 28 interconnects vertically the load pass pipe 24 and the impact bar 25 which correspond to the two reinforcing members at a position which is located in back of front ends of these members 24, 25 as shown in FIG. 2.

As shown in FIG. 3, the junction 28 has a projection portion 28a which projects in an arc shape along an outward face, in the vehicle width direction, of the load pass pipe 24. The junction 28 is fixed to the inward side, in the vehicle width direction, of the impact bar 25 at its lower end portion 28b as shown in FIGS. 4 and 5, fixed to the outward side, in the vehicle width direction, of the load pass pipe 24 at its projection portion 28a, and also fixed to the respective outward sides, in the vehicle width direction, of the beltline reinforcement 26 and the door mirror reinforcement 27 at its upper end portion 28c as shown in FIGS. 2 and 4.

The upper end portion 28c of the junction 28 are jointly fixed to the outward side face, in the vehicle width direction, of the reinforcements 26, 27 at respective joint points a, b, c, d, which are illustrated by dots in black in FIG. 5, front and rear portions of the junction 28 which are located just below the projection portion 28a are jointly fixed to the outward side face, in the vehicle width direction, of the door mirror reinforcement 27 at respective joint points e, f, and the lower end portion 28b of the junction 28 are jointly fixed to the inward side face, in the vehicle width direction, of the impact bar 25 at respective joint points g, h. Thus, in the present embodiment, the load pass pipe 24 is held by and fixed to the projection portion 28a of the junction 28 and the recess portion 27b of the door mirror reinforcement 27.

As described above, the attachment structure of a door mirror of the present embodiment comprises the front side door 1 as a door provided on the driver's-seat side of the vehicle which comprises the inner panel 3 and the outer panel 2, at least the two reinforcing members (see the load pass pipe 24, the impact bar 25) provided, apart from each other in the vertical direction, between the inner panel 3 and the outer panel 2, extending in the vehicle longitudinal direction from the front end to the rear end of the door, and fixed to the front and rear ends of the door at the both ends thereof, the door mirror reinforcement 27, to which the door mirror 9 positioned in back of the front end of the side window 6 of the door is fixed via the outer panel 2 of the door, and the connecting member (see the junction 28) formed integrally with or separately from the door mirror reinforcement 27, the connecting member (the junction 28) interconnecting the two reinforcing members (the load pas pipe 24, the impact bar 25) vertically at the position which is located in back of front ends of the two reinforcing members (the load pass pipe 24, the impact bar 25) (see FIGS. 2 and 4).

According to this constitution, since the door mirror 9 is positioned in back of the front end of the side window 6 of the door for a relatively-rear layout of the door mirror 9, the better visibility can be provided. Further, since the door mirror 9 is indirectly connected to the reinforcing members (the load pass pipe 24, the impact bar 25) provided inside the door on the driver's-seat side via the connecting member (the junction 8), the attachment rigidity of the door mirror 9 can be increased. Moreover, since the two reinforcing members (the load pass pipe 24, the impact bar 25) are interconnected vertically by the connecting member (the junction 8) at the position located in back of the front ends of the two reinforcing members (the load pas pipe 24, the impact bar 25), the door strength against the vehicle side collision can be improved, thereby improving the safety in the vehicle side collision.

Further, the connecting member (the junction 8) is fixed to the inward side, in the vehicle width direction, of one (the impact bar 25) of the two reinforcing members and to the outward side, in the vehicle width direction, of the other (the load pass pipe 24) of the two reinforcing members (see FIG. 4). According to this constitution, the load which is inputted to the above-described one reinforcing member (the impact bar 25) inward in the vehicle width direction in the vehicle side collision can be surely transmitted to the above-described other reinforcing member (the load pass pipe 24) via the connecting member (the junction 28), so that the side-collision load can be properly dispersed.

Also, the distance, in the vertical direction, of the two reinforcing members (the load pass pipe 24, the impact bar 25) increases toward the vehicle rear (see FIG. 2). Thereby, since the reinforcing members (the load pass pipe 24, the impact bar 25) are interconnected by the connecting member (the junction 28) at the position where the two reinforcing members (the load pass pipe 24, the impact bar 25) are apart from each other, the strength against the side collision can be increased and also the load transmission efficiency can be improved.

Additionally, the above-described other reinforcing member (the load pass pipe 24) extends substantially horizontally from the position of the door hinge (see the attachment position of the upper door hinge bracket 11), and the above-described one reinforcing member (the impact bar 25) is arranged below the other reinforcing member (the load pass pipe 24) (see FIG. 2). According to this constitution, the above-described other reinforcing member (the load pass pipe 24) is a member having a high strength in the vehicle longitudinal direction, the above-described one reinforcing member (the impact bar 25) is a member having a high strength in the vehicle width direction, and these members 24, 25 are interconnected by the connecting member (the junction 28) at a position where these members 24, 25 are apart from each other. Accordingly, the improvement of the attachment rigidity of the door mirror 9 in plural directions (the vehicle longitudinal direction, the vehicle width direction) can be attained and also the superior anti-vibration effect can be ensured.

One of the reinforcing members of the present invention corresponds to the impact bar 25 of the above-described invention. Likewise, the other of the reinforcing members corresponds to the load pass pipe 24, the connecting member corresponds to the junction 28, and the door provided on the driver's-seat side of the vehicle corresponds to the front side door 1.

The present invention should not be limited to the above-described embodiment, and any other modifications or improvements may be applied within the scope of a sprit of the present invention. For example, while the above-described embodiment shows the case in which the connecting member (see the junction 28) is formed separately from the door mirror reinforcement 27, it may be formed integrally with the member 27. Further, the above-described embodiment is applicable to a door of any vehicle equipped with front and rear doors, or any vehicle not equipped with a rear door.

What is claimed is:

1. An attachment structure of a door mirror, comprising:
    a door provided on a driver's-seat side of a vehicle and comprising an inner panel and an outer panel;
    a beltline reinforcement provided to extend along a beltline portion of the outer panel of the door for reinforcing the beltline portion;
    at least two reinforcing members provided, separately from the beltline reinforcement and apart from each other in a vertical direction, between the inner panel and the outer panel of the door, extending in a vehicle longitudinal direction from a front end of the door to a rear end of the door, and fixed to the front and rear ends of the door at both ends thereof;
    a door mirror reinforcement, to which the door mirror positioned in back of a front end of a side window of the door is fixed via the outer panel of the door; and
    a connecting member formed separately from the door mirror reinforcement, the connecting member interconnecting the two reinforcing members vertically at a position which is located in back of front ends of the two reinforcing members,
    wherein a front portion of said beltline reinforcement is arranged to overlap said door mirror reinforcement partially in the vehicle longitudinal direction,
    said door mirror is configured to be fixed to the door mirror reinforcement and said front portion of the beltline reinforcement via the outer panel,
    an upper-level member of said two reinforcing members is made of a pipe-shaped member, and
    said connecting member and said door mirror reinforcement are arranged to overlap each other partially in the vertical direction, interposing said pipe-shaped reinforcing member therebetween, such that the pipe-shaped reinforcing member is held by and fixed to the connecting member and the door mirror reinforcement.

2. The attachment structure of a door mirror of claim 1, wherein said connecting member is fixed to an inward side, in a vehicle width direction, of one of said two reinforcing members and to an outward side, in the vehicle width direction, of the other of the two reinforcing members.

3. The attachment structure of a door mirror of claim 1, wherein said two reinforcing members are configured such that a distance, in the vertical direction, of the two reinforcing members increases toward a vehicle rear.

4. The attachment structure of a door mirror of claim 2, wherein said two reinforcing members are configured such that a distance, in the vertical direction, of the two reinforcing members increases toward a vehicle rear.

5. The attachment structure of a door mirror of claim 2, wherein said other of the two reinforcing members extends substantially horizontally from a position of a door hinge, and said one of the two reinforcing members is arranged below the other of the two reinforcing members.

6. The attachment structure of a door mirror of claim 3, wherein said other of the two reinforcing members extends substantially horizontally from a position of a door hinge, and said one of the two reinforcing members is arranged below the other of the two reinforcing members.

7. The attachment structure of a door mirror of claim 4, wherein said other of the two reinforcing members extends substantially horizontally from a position of a door hinge, and said one of the two reinforcing members is arranged below the other of the two reinforcing members.

8. The attachment structure of a door mirror of claim 1, wherein said connecting member has a projection portion which projects in an arc shape along an outer face of said pipe-shaped reinforcing member, said door mirror reinforcement has a recess portion which is concaved in an arc shape along the outer face of the pipe-shaped reinforcing member, and the pipe-shaped reinforcing member is held by and fixed to said projection portion of the connecting member and said recess portion of the door mirror reinforcement.

\* \* \* \* \*